United States Patent [19]

Bienz

[11]  4,266,492
[45]  May 12, 1981

[54] LACING MACHINE NEEDLE GUARD

[75] Inventor: Edward F. Bienz, Fort Wayne, Ind.

[73] Assignee: General Electric Company, Fort Wayne, Ind.

[21] Appl. No.: 16,090

[22] Filed: Feb. 28, 1979

[51] Int. Cl.³ ............................................ D05B 83/00
[52] U.S. Cl. ................................ 112/121.2; 83/397.1; 192/133
[58] Field of Search .................. 112/2, 85, 89, 21, 261, 112/121.2; 29/606, 596; 83/440.2, 397, 397.1; 144/251 R, 251 A, 251 B; 192/133, 134, 135; 200/61.42; 66/1 R

[56] References Cited

U.S. PATENT DOCUMENTS

| | | | |
|---|---|---|---|
| 2,487,396 | 11/1949 | Summers | 144/251 R |
| 2,539,902 | 1/1951 | Foley | 83/397 |
| 2,580,871 | 1/1952 | Wintz | 112/121.2 |
| 3,331,408 | 7/1967 | Condit | 200/61.42 |
| 3,344,760 | 10/1967 | Muskulus et al. | 112/2 |
| 3,859,950 | 1/1975 | York | 144/251 A |
| 4,033,218 | 7/1977 | Donatelle | 83/397 |

FOREIGN PATENT DOCUMENTS

664173  6/1963  Canada ...................................... 83/397
299834  11/1928  United Kingdom ...................... 112/261

OTHER PUBLICATIONS

Tough-O-Matic Advertisement, (Submitted with applicant's prior art statement of 6/21/79, no publication date given).

*Primary Examiner*—Werner H. Schroeder
*Assistant Examiner*—Andrew M. Falik
*Attorney, Agent, or Firm*—Ralph E. Krisher, Jr.

[57] ABSTRACT

A protective guard arrangement to lessen the likelihood of a lacing machine operator receiving injury from a lacing machine while performing a stator assembly operation is disclosed including a sleeve-like guard open at opposite ends and pivotally attached to the machine by an arm which is power actuable to pivot between a retracted position and an operational position wherein operator access to the region of machine stator interaction is obstructed. The guard position is determined and machine operation impeded if the guard is in other than the operational position. In operation, enhanced operator safety is achieved by positioning a stator on a stator processing machine, actuating the machine, confirming the presence of the operator safety shield in a position to impede operator access to the region of machine action on the stator and initiating machine processing of the stator only after the shield presence has been confirmed. Actuation of the machine typically includes initiating movement of the shield from a position allowing the operator free access to the region of machine action for positioning and removing stators to the operator access impeding position which is sufficiently close to the stator to preclude the operator from placing his finger between the shield and the stator while providing sufficient clearance between the stator and the shield to allow operator placement of a small hand-held additional workpiece between the shield and the stator to be affixed to the stator during processing by the machine.

5 Claims, 3 Drawing Figures

LACING MACHINE NEEDLE GUARD

BACKGROUND OF THE INVENTION

The present invention relates generally to lacing machines and more particularly to methods and apparatus for protecting a lacing machine operator during machine processing of dynamoelectric machine stators.

Lacing machines generally employ a cooperating pair of moving members or elements, one dispensing cord, and the other (called a hook or needle) selectively engaging the cord in loops to translate those loops relative to the workpiece and the dispensing element to tie or stitch the cord progressively about the workpiece. Thus, for example, while lacing end turns of dynamoelectric machine stators, the lacing needle frequently executes a staggered reciprocating motion generally perpendicular to the stator bore axis alternately between the end turn portions and the stator core side surface and beyond the end turn portions. In synchronism with needle motion, the dispensing element presents a section of cord to the needle during each reciprocation and this, coupled with appropriately timed rotation of the needle about its axis of reciprocation to pick up and drop the loop, allows an interlocked chain of such loops to be formed. Periodic indexing of the stator about its bore axis allows such a chain of loops to be formed about the entire end turn region of the stator. Apparatus and methods for tying coils are described, for example, in Gawthrop et al, U.S. Pat. Nos. 3,659,337; Fields et al, 3,813,754; and Habegger et al, 3,824,940, all of which are assigned to the assignee of the present application. Other patents relating to lacing machines include Frederick, U.S. Pat. Nos. 3,440,979 and Frederick, 3,685,470 which are assigned to Link Engineering Company. The entire disclosure of each of these above-mentioned patents is specifically incorporated herein by reference.

In such coil tying methods and apparatus, it is frequently desirable that the operator actively participate in the tying process, for example by holding a small workpiece in the vicinity of the moving lacing needle so that the workpiece may be tied to the end turn portions during the lacing operation. Frequently, such a workpiece will comprise a small identification tag or additional winding insulating material.

The potential operator hazards associated with lacing machines of this general type have been recognized and the safety feature frequently employed as an option on commercially available lacing machines comprises a photoelectric cell-light source arrangement where the light pathway between the source and cell traverses a region between the operator and the lacing machine needle path. If the operator reaches into the area of the needle path, the light pathway is interrupted and machine operation impeded. These electric eye safety devices have been less than completely satisfactory for several reasons. The source-sensor light pathway is limited in size and the potential for an operator to intentionally or accidentally reach around the light pathway and into a hazardous region is ever present. To adapt to various installation situations, the sensor and light source are typically adjustable, raising frequent misalignment problems. The opportunity for active operator participation in the lacing process, such as for example, to hand position a small workpiece, such as insulating material or an identification tag, in the region of the needle path during lacing, to attach that workpiece to the structure being laced by the lacing machine, is quite restricted since the operator in attempting such active participation will frequently inadvertently block the light pathway, stopping the machine.

SUMMARY OF THE INVENTION

Among the several objects of the present invention may be noted the provision of a safety arrangement for a lacing machine which allows active participation in the lacing process by a machine operator while minimizing the potential for injury to that operator; the provision of a hazard-reducing method and apparatus for a reciprocating machine; the provision of an operator safety enhancing process of assembling dynamoelectric machine stators; and the provision of a safety shield arrangement for a lacing machine pivotal between a retracted position where machine operation is impeded and the operator is allowed access for removing and replacing workpieces, and an operational position obstructing operator access to the region of machine-workpiece interaction. These as well as other objects and advantageous features of the present invention will be in part apparent and in part pointed out hereinafter.

In general, a protective arrangement for a lacing machine includes a transparent shield which is open at opposite ends thereof and is pivotally attached to the machine by an arm so that the shield may be moved between a retracted position allowing an operator access to the region of machine reciprocation and an operational position where machine reciprocation occurs within the transparent shield. The shield position is determined and needle reciprocation impeded when that determination indicates the shield to be in other than the operational position.

Also in general and in one form of the invention, a safety device for a dynamoelectric machine stator lacing machine includes a sleeve-like guard movable between a retracted position and an operational position obstructing access to the region between the lacing needle and the stator end turn portions. A guard position limit switch is effective to hinder needle reciprocation when that limit switch status indicates the guard to be in other than its operational position.

Still further in general and in one form of the invention, enhanced operator safety is imparted to a process of assembling dynamoelectric machine stators by positioning a stator on a stator processing machine, actuating that machine, confirming the presence of an operator safety shield in a position to impede operator access to a region of machine action on the stator, and initiating machine processing of the stator only after the shield presence has been confirmed.

BRIEF DESCRIPTION OF THE DRAWINGS

Corresponding reference characters indicate corresponding parts throughout the several views of the drawings.

Figure 1:
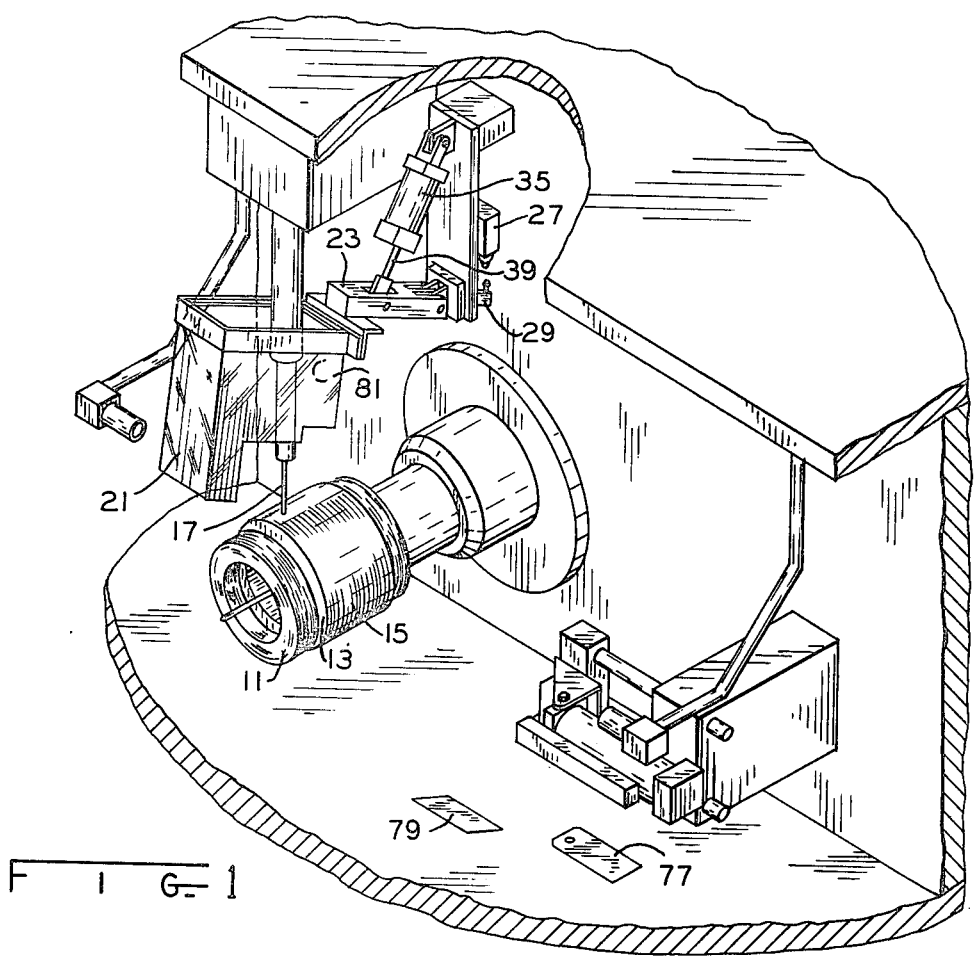
FIG. 1 is a perspective view of a portion of a lacing machine incorporating one form of the invention.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawings generally, there is illustrated a stator lacing machine for tying cord about end turn portions 11 of coils projecting beyond a side surface 13 of a magnetic core 15. Thus, the workpiece illustrated on which the machine is to perform an assembly operation, such as a lacing operation, comprises a dynamoelectric machine stator of relatively conventional construction including a magnetic core of laminated sheets of magnetic material with that core having a rotor-accepting bore and a plurality of generally axially extending slots for receiving side turn portions of the stator coils. While the lacing operation might be performed simultaneously on end turn portions at both stator core sides, a lacing operation for only one set of end turns is illustrated.

The typical power operated lacing machine includes first and second members 17 and 19 which are movable in generally orthogonal directions and cooperate to perform the lacing operation. Member 17 is referred to as a lacing needle and is movable along an axis generally perpendicular to the axis of the rotor-accepting bore of the stator core. Member 19 is reciprocable generally along that bore axis and dispenses the lacing cord.

While the interacting movements of the members 17 and 19 may differ for differing lacing machines or may even differ for different lacing operations within the same lacing machine, a not uncommon arrangement is for the lacing needle to have a hook near the free end thereof so that the lacing needle may be passed between end turns 11 and core face 13 to hookingly engage the cord whereupon the needle is retracted, pulling the cord radially outwardly between the end turns and core face. The axis of needle reciprocation is then shifted somewhat and the position of the cord dispensing member shifted somewhat, both toward the left, as viewed in FIG. 2, whereupon the lacing needle again is moved toward the stator core bore axis to again hookingly engage and retract the cord. During this process, the lacing needle is also rotated about its axis of reciprocation so as to have the open side of the needle hook directed in the appropriate direction to engage the cord at the appropriate time to form a continuing chain of interlocking loops as the lacing process proceeds. Thus, the typical motion executed by the lacing needle will be a translation, rotation, translation, lateral shifting, translation, rotation, translation and lateral shifting back to the initial point, all as more completely described in several of the aforementioned United States patents.

The operator protective arrangement for such a cord tying machine includes a transparent shield 21 of a generally rectangular hollow configuration open at opposite ends. The transparent shield 21 is supported on an arm 23 which is pivotally attached to the machine by a fulcrum pin 25. Thus, as the arm 23 pivots about the pivot point 25, the shield 21 is moved between the operational position illustrated in FIG. 2, where machine reciprocation of the lacing needle 17 occurs within the transparent shield 21, and the retracted position illustrated in FIG. 1, allowing the operator access to the dynamoelectric machine stator for, for example, removing a completely laced stator and substituting therefor a new stator to be subjected to the lacing operation.

The position of the shield 21 is determined by the status of the contacts of a microswitch or limit switch 27 which is actuated by the extension 29 of arm 23. Thus, in the position illustrated in FIG. 2, limit switch 27 has its contacts closed by the depression of spring loaded plunger 31 which is actuated against its normal spring loading by stud 33 extending upwardly from the arm extension 29. When arm 23 is pivoted clockwise as viewed around pivot 25 to raise the shield 21, arm extension 29 lowers, allowing the limit switch to extend plunger 31 and open the limit switch contacts.

Pivoting of the arm 23 and therefore also movement of the shield 21 between its retracted and operational positions, is effected by air actuable cylinder 35, one end of which is pivotally attached to the machine frame, as at pivot point 37, with the other end of the extensible and retractable piston rod 39 being pivotally attached to the arm 23 at pivot point 41.

Expansion and retraction of the cylinder piston rod 39 relative to the main body of cylinder 35 is therefore effective to move the shield between its retracted and operational positions.

Figure 2:
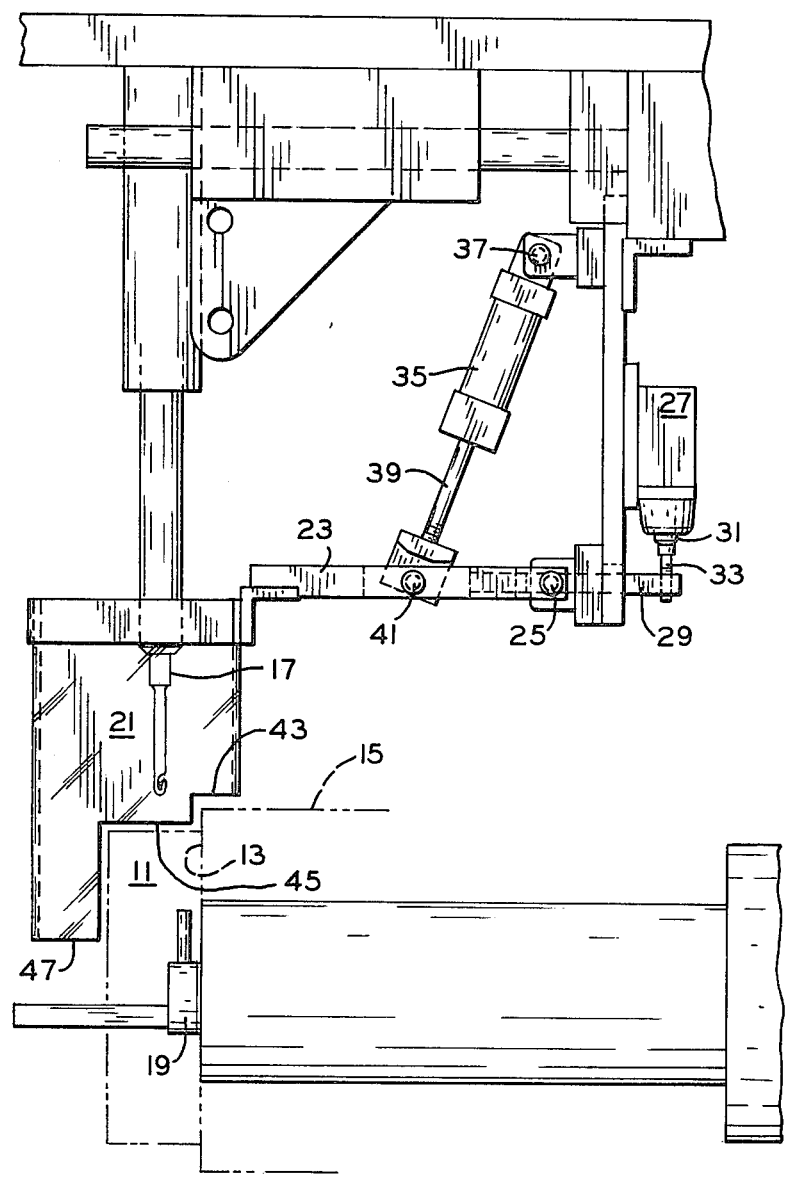
FIG. 2 is a plan view of a portion of the lacing machine illustrated in FIG. 1 with the operator protective device in its operational position.

As best seen in FIG. 2, it will be noted that the open or lower end of the shield 21, which end is adjacent to the magnetic core 15 and end turn portions 11, is contoured to fit closely adjacent to portions of the radial outer peripheries of both the core and the end turn portions. As illustrated, this lower open end has a stepped configuration with end portion 43 fitting closely adjacent to the stator core 15 while end portion 45 extends downward somewhat beyond end portion 43 so as to lie closely adjacent a portion of the outer periphery of the end turns 11. Shield end portion 47 is extended still further downwardly to protect the operator and prevent that operator from getting a finger or hand inside the end turn portions and in between the movable members 17 and 19. There is, however, sufficient clearance between the end turn portions 11 and edge 45 of the shield 21 to allow an operator to hand hold additional workpieces such as a strip of insulating material or an identification tag so that that workpiece extends into the lacing region to be attached to the end turn portions by the lacing operation.

Figure 3:
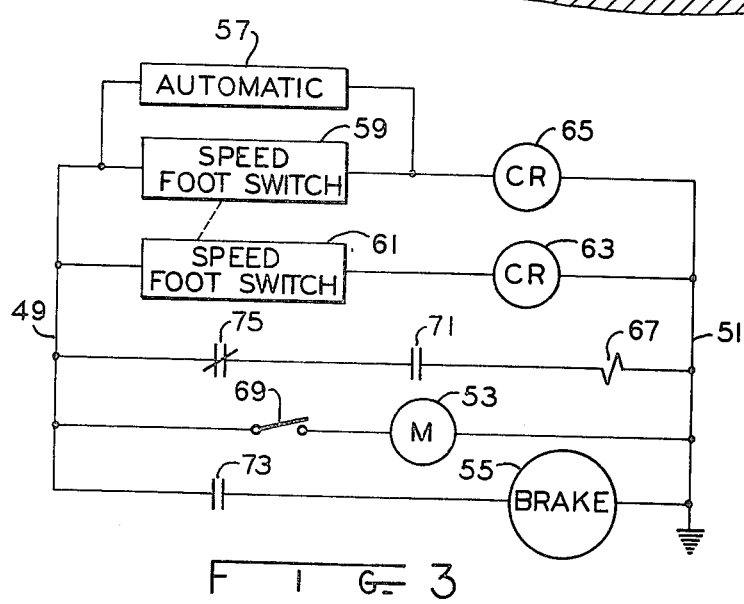
FIG. 3 is a schematic illustration of the modifications of a prior art lacing machine control circuit to accommodate the present invention in one form.

FIG. 3 illustrates in an abbreviated schematic form, the modifications made to one prior art lacing machine control circuit to accommodate the present invention in one form thereof. Such control circuits typically employ a plurality of control relays and their contacts, as well as other limit switches and control switches, in series and parallel configurations between a pair of normally energized lines 49 and 51. Included within such prior art control circuits are a drive motor enabling relay 53 and a relay 55, controlling a braking arrangement on the lacing machine to stop the lacing operation abruptly under certain conditions. Such typical control circuitry will also include a switching arrangement 57 for initiating machine operation in an automatic mode and may further include a multiple pole, multiple position operator actuable switch for operating the machine in a manual mode, such as for example, the foot operated speed control switches 59 and 61.

Such conventional lacing machine control circuitry may be modified by the addition to two control relays having actuating coils 63 and 65 along with a solenoid having actuating coil 67 for actuating the air actuable cylinder 35 and contacts 69 of the limit switch 27 with the status of these contacts 69 determining the position of the guard of FIGS. 1 and 2. The limit switch contacts 69 are in series with the drive motor actuating circuit 53 so as to preclude motor operation and therefore of course machine operation unless contacts 69 are closed indicating the guard to be in its operational or operator protecting position. Control relay 65 is enabled whenever the lacing machine is actuated in the automatic mode by the closing of switching circuitry 57 and in the manual mode by the closing of switching circuitry 59 associated with, for example, the operator actuable speed control foot switch. Associated with control relay 65 are normally open contacts 71 which close when the machine is energized, actuating solenoid 67 to enable air actuated cylinder 35 to lower the shield 21 into the operator protecting or operational position illustrated in FIG. 2. When the shield is in that lowered position, extension 29 of the arm 23 actuates limit switch 27 to close contacts 69, enabling the motor control relay 53, and initiating machine operation. If the machine is operating in its manual mode with switching arrangement 57 open and switching arrangement 59 closed to initiate machine operation, the several foot switch positions are effective to change the speed of the lacing operation. This foot switch includes contacts 61 which are closable by operator actuation to interrupt the lacing operation. Closing of the foot switch contacts 61 in addition to interrupting machine operation, also enables control relay 63 to open the normally closed contacts 75 associated with control relay 63, and to close the normally open contacts 73 associated with that control relay. Closure of contacts 73 enables the machine brake relay 55 to rapidly stop the machine and opening of the normally closed contacts 75 disables solenoid 67, and the disabling or deenergization of that solenoid 67 causes air actuated cylinder 35 to retract its piston rod 39, pivoting the shield from the position illustrated in FIG. 2 into the position illustrated in FIG. 1. This allows the operator to substitute a new stator for a stator on which the lacing operation has been completed, as well as allowing operator intervention as to position additional insulating material or identification tags in the end turn region for subsequent attachment by the lacing operation.

In summary then, an improvement in enhanced operator safety in the process of assembling a product such as a dynamoelectric machine stator is achieved by the operator first positioning a stator on the processing machine, such as the lacing machine illustrated in FIG. 1, whereupon the operator actuates the lacing machine, and shield 21 lowers to the position illustrated in FIG. 2. The presence of that safety shield in position to impede operator access to the region of the lacing operation is confirmed by the closing of contacts 69 of limit switch 27 whereupon actual machine processing of the stator is initiated. While the shield 21 is in the position illustrated in FIG. 1, the operator has free access to the stator for both stator replacement and for placing tags such as tag 77 or additional insulating material such as insulating piece 79 which may be formed of an insulating material such as, for example, material marketed under the trade name "MYLAR" by E. I. DuPont de Nemours and Company, in position closely adjacent end turn portions of the stator. Even with the shield in the position illustrated in FIG. 2, sufficient clearance between the stator and shield remains for the operator to place such small hand-held workpieces between the stator and the shield to be affixed to the stator during the processing of that stator by the machine.

Although the shield 21 is illustrated as being formed in a generally rectangular configuration from transparent material such as, for example, "Lexan" marketed under this trade name by the General Electric Company, it can readily be appreciated that the shield can be formed into different shapes and/or from different materials depending on the particular application or machine. For example, a shield was fabricated with three sides thereof formed of "Lexan" material and establishing a partially enclosed rectangle and with a back side (corresponding to side 81 in FIG. 1) having an arcuate shape and formed from an aluminum material.

From the foregoing, it is now apparent that a novel protective guard arrangement, as well as a novel approach to the problem of operator safety, in the process of assembling dynamoelectric machine stators, have been disclosed meeting the objects and advantageous features set out hereinbefore as well as others, and that modifications as to the precise configurations, shapes and details may be made by those having ordinary skill in the art without departing from the spirit of the invention or the scope thereof as set out by the claims which follow.

What I claim as new and desire to secure by Letters Patent of the United States is:

1. An apparatus for tying cord about end turn portions of coils projecting beyond at least one side surface of a magnetic core carrying side turn portions of the coils and having at least one lacing needle executing at least reciprocatory motion toward and away from the coil end turn portions for tying cord about those coil end portions, a safety device for selectively discouraging operator intervention between the coil end turn portions and the lacing needle comprising: a sleeve-like guard movable between a retracted position and an operational position obstructing access to a region between the needle and the end turn portions; guard position determining means for hindering needle reciprocatory motion when the guard is determined to be in other than the operational position; an arm pivotally attached to the cord tying apparatus with said sleeve-like guard supported thereon near a free end thereof; power actuable means for pivoting said arm to move said guard between the retracted and the operational positions; and an operator actuable variable speed control means for controlling at least the speed of the at least one lacing needle reciprocatory motion between a full stop and a normal operating speed, the power actuable means being responsive to the speed control means to pivot the guard from the retracted position to the operational position when the speed control means is moved from a full stop position and to pivot the guard from the operational position to the retracted position when the speed control means is moved to the full stop position.

2. An apparatus for tying cord about end turn portions of coils projecting beyond at least one side surface of a magnetic core carrying side turn portions of the coils and having at least one lacing needle executing at least reciprocatory motion toward and away from coil end turn portions for tying cord about said coil end turn portions, a safety device for selectively discouraging operator intervention between the coil end turn portions and the lacing needle, the apparatus comprising: a sleeve-like guard movable between a retracted position and an operational position obstructing access to a region between the needle and the end turn portions; said guard having a pair of oppositely located open ends; one of said open ends being more closely adjacent the end turn portions in the operational position of the guard and being contoured to conform to a portion of the core and end turn portions; guard position determining means for hindering reciprocatory motion of the needle when said sleeve-like guard is determined to be in other than said operational position; an arm pivotally attached to the cord tying apparatus with said sleeve-like guard supported thereon near a free end thereof; the end of the guard that is contoured being stepped with guard portions more remote from the arm pivot attachment being generally longer than guard portions closer to the pivot attachment.

3. An apparatus for tying cord about end turn portions of coils projecting beyond at least one side surface of a magnetic core carrying side turn portions of the coils and having at least one lacing needle executing at least reciprocatory motion toward and away from the coil end turn portion for tying cord about said coil end turn portions, and a safety device for selectively discouraging operator intervention between the coil end turn portions and the lacing needle, the apparatus comprising: a sleeve-like guard moveable between a retracted position and an operational position obstructing access to a region between the needle and the end turn portions; an arm pivotally attached to the cord tying apparatus with said sleeve-like guard supported thereon near a free end thereof; said guard being open at a pair of oppositely located ends; one of said open ends being more closely adjacent the end turn portions in the operational position of the guard and being contoured to conform to a portion of the core and end turn portions; and guard position determining means for hindering reciprocatory motion of the needle when the sleeve-like guard is determined to be in other than the operational position; said sleeve-like guard open ends being aligned generally with the direction of needle reciprocatory motion when in the operational position, and said needle being supported to provide for its passing into the guard through one open end and its movement through the guard to generally the contoured open end; the direction of movement of the needle being reversed upon movement of the needle through the guard to generally the contoured open end.

4. In an operator controlled stator lacing machine having first and second members movable generally orthogonal to one another and cooperating to perform a lacing operation, a protective guard arrangement for selectively blocking operator access to a region of machine-workpiece interaction to lessen the likelihood of the operator receiving an injury from the machine while the operator is performing a workpiece lacing operation, the improvement comprising: a sleeve-like guard open at opposite ends thereof; an arm pivotally attached to the machine and supporting the guard near one end of the arm; power actuable means for pivoting the arm to move the guard between a retracted position and an operational position blocking operator access to the region of machine-workpiece interaction; guard position determining means operable to impede machine operation when the guard is in other than the operational position; and an operator actuable control means for controlling the machine to change between a quiescent state and an operating state, the power actuable means being responsive to the control means to automatically move the guard to the retracted position when the control means transitions from an operating state indication to a quiescent state indication and to move the guard to the operational position when the control means transitions from a quiescent to an operating state indication.

5. The protective guard arrangement of claim 4 wherein the position determining means and control means are interconnected to render the control means ineffective to change the machine to an operating state so long as the guard is in other than the operational position.

* * * * *